W. H. ROUNDY.

Assignor of one-third to CUNNINGHAM & JONES.

Car Coupling.

No. 9,739. Reissued June 7, 1881.

Witnesses:
Frank W. Hess.
R. G. Orwig.

Inventor:
William H. Roundy,
By Thomas G. Orwig.
Attorney.

N. PETERS, Photo-Lithographer, Washington, D. C.

UNITED STATES PATENT OFFICE.

WILLIAM H. ROUNDY, OF MARSHALLTOWN, IOWA, ASSIGNOR OF ONE-THIRD TO CUNNINGHAM & JONES, OF SAME PLACE.

CAR-COUPLING.

SPECIFICATION forming part of Reissued Letters Patent No. 9,739, dated June 7, 1881.

Original No. 234,727, dated November 23, 1880. Application for reissue filed February 2, 1881.

*To all whom it may concern:*

Be it known that I, WILLIAM H. ROUNDY, of Marshalltown, in the county of Marshall and State of Iowa, have invented an Improved Car-Coupling, of which the following is a specification.

The object of my invention is, first, to combine a draw-bar with a car and rock-shaft having a crank or cam in its center in such a manner that the complete coupling can be applied to a common car without cutting and weakening any of the timbers, and also in such a way that the draw-bar will have abundant lateral and longitudinal play under the cam of the rock-shaft without interfering with the cam and its operations; second, to combine a pin-carrying lever with a draw-head in such a manner that the pivotal pin upon which the coupling-pin is suspended to the lever, and also the fulcrum-pin of the lever, will each be relieved from the strain occasioned by the pushing and pulling of cars when flexibly connected by means of a link.

It consists in combining a draw-bar, a pivoted lever carrying a coupling-pin, and a crank-shaft on a car in such a manner that there will be space between the car and the draw-bar to allow the crank on the shaft above the draw-bar to revolve and operate the pivoted lever, while the draw-bar has free lateral and longitudinal play beneath the crank-shaft; and also in forming a head on the front end of the pin-carrying lever, to bear it down into the draw-head, and to engage shoulders formed in the slot of the draw-head, all as hereinafter fully set forth.

Figure 1:
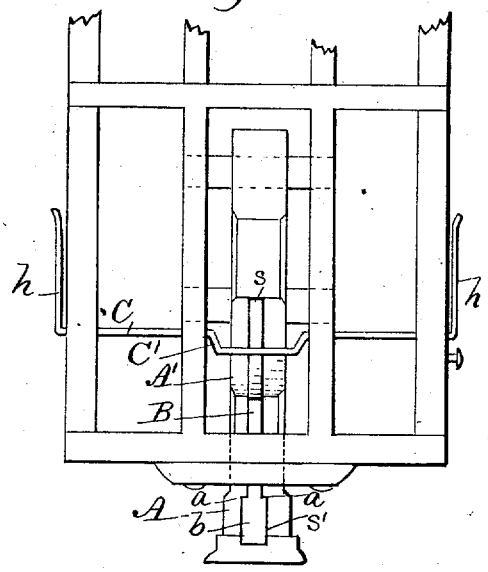
Figure 2:
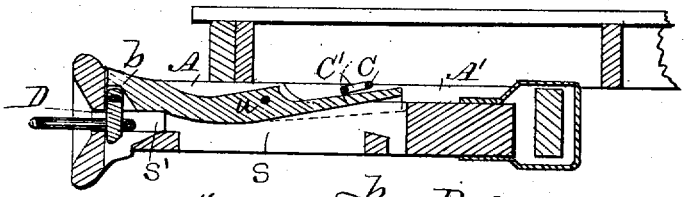
Figure 3:
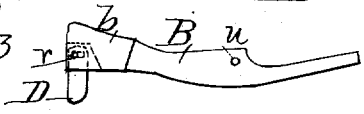
Figure 4:
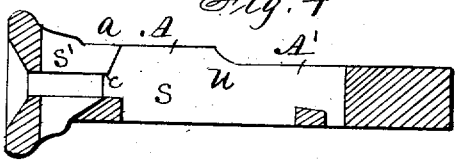

In the accompanying drawings, Figure 1 is a plan view of my improved coupling; Fig. 2, a longitudinal section of the same; Fig. 3, a view of the lever detached, and Fig. 4 a longitudinal section of the draw-bar with the lever and pin removed.

Similar letters of reference indicate corresponding parts.

A represents a draw-bar of the usual external form, excepting that a portion of its top surface, A′, extending from near its longitudinal center rearward, is about an inch and a half lower than the top surface of its front portion. It is flexibly connected with a car by common means in such a manner that the top surface of its front end and head will be on a level with the lower edges and surface of the car-frame, while the top surface of its rear portion will be sufficiently below the car-frame to allow free vertical play to the pin-carrying lever, and also free longitudinal and lateral play to the draw-bar, without interfering with the operation of the central crank of the crank-shaft that is operated in fixed bearings attached to the bottom of the car-frame. The front end and head of the draw-bar has the requisite bell-mouth for the reception of a common coupling-link. Vertically through the center of the draw-bar is a longitudinal slot, *s*, which is extended through the bottom of the draw-bar, so as to prevent collection of dust, water, or snow therein. The forward extremity of the aforesaid slot terminates in a rectangular mortise, *s′*, extending part way into the flaring end of the draw-head, and having an enlarged width, forming abrupt shoulders *a a* at its junction with the slot *s*.

B is a lever pivoted in the slot *s*, about midway its length, by means of a pin, *u*, and below the top surface of the draw-bar, so as to avoid interference of the lever with the frame of the car. The rear portion of this lever B conforms in shape with the depression A′ in the top surface of the draw-bar, and its front end inclines upward from the draw-head, as shown in Fig. 3, and terminates in an enlarged and elevated head, *b*, which, by its weight, serves to automatically depress said end of the lever, and thus dispenses with the use of springs, as heretofore employed, and not only found unreliable, but also incapable of releasing the coupling in case of accidental upsetting of the car. The head *b* is fitted to the mortise *s′*, before described, and enters the same completely, so as to bring its top flush with the top of the draw-bar, thereby bracing and protecting the end of the lever B. A shoulder or offset, *c*, on the interior of the mortise *s′*, at a proper distance from the top of the draw-bar, serves as a stop to support the end of the lever when entered into the mortise.

D represents the coupling-pin, pendent from the forward end of the lever B, and of sufficient length to enter a mortise in the lower jaw of the bumper, and thus obtain a bearing for the lower extremity of the pin when subjected to the strain of the coupling-link. The upper end of the pin D has an elongated pin-hole, by means of which it is pivoted in a recess in the under side of the lever by a pin, *v*, passed transversely through said parts. The lever B, with its coupling-pin thus flexibly connected, is held yieldingly in a depressed position by the weighted head *b* at its front end.

The collision with the pendent pin D of the coupling-link of the approaching car presses said pin rearward until it strikes the rear face of the recess in the lever, which face is at a proper angle to afford a good bearing for the back of the pin, and arrest the rearward thrust of the same in such a position as to present a wedging-surface to the approaching link, the pressure of which against said pin forces the lever B upward sufficiently to raise the pin over the end of the link and allow the same to drop into and engage said link.

It is designed to have the front face of the pin bearing against the inner face of the mortise in the draw-bar, and thus take the strain off the pivotal pins *v* and *u* of the coupling-pin and coupling-lever respectively, and throw it directly on the draw-bar; and to accomplish this more effectually the pivot-hole *r* in the top end of the coupling-pin D, or in the front end of the lever B, is elongated horizontally, so as to allow the pin to move forward, according to the abrasion of the front face of the pin and the adjacent face of the mortise *s'*, and maintain them in contact. The rear shoulders of the head *b*, abutting against the shoulders *a a* of the mortise *s'*, arrest the rearward thrust of the lever when subjected to the collision of the coupling-link with the coupling-pin in the act of coupling, thereby relieving the pivotal pin of the lever B of all strain, and, in conjunction with the compensating connection of the coupling before described, overcoming all the difficulties which have deprived analogous couplings of their efficiency and durability.

Across the under side of the car body or frame, and in bearings fixed to the car, is a crank-shaft, C, bent at right angles in its center to form an elongated cam, C', that extends crosswise over the sliding draw-bar and the rear portion of the lever B, as shown in Fig. 1. By means of suitable handles, *h*, on the ends of the shaft C outside of the car-body, the shaft can be rocked in its bearings to cause the crank or cam C' to depress the rear end of the lever at the same time that the said lever and the draw-bar may be moving laterally or longitudinally under the said shaft C and its cam C'. When the rear end of the lever B is thus depressed its front end will be elevated, as required in uncoupling, to lift the coupling-pin to release the coupling-link. Thus in case it is desired to make what is termed a "running-switch" of a car, or push the car without coupling with it, it is only necessary to seize one of the handles *h* and turn the shaft C sufficiently to cause the cam C' to depress the rear end of the lever B.

I am aware that a draw-bar having a depression in the central portion of its top surface and a longitudinal slot in which a coupling-lever was pivoted has been combined with a car and a rock-shaft having a hook-shaped cam that entered the slot in the draw-bar to operate the coupling-lever pivoted in the slot; but such entering of the cam into the slot interferes with the lateral movements of the draw-bar provided for by my improvement.

I am also aware that a pin-carrying lever pivoted in a draw-bar has been provided with an elongated passage for its fulcrum-pin, so as to allow said lever to be drawn forward and cause the coupling-pin to bear against the forward face of its passage through the draw-bar, and thus relieve the fulcrum-pin of the lever of the strain; but such an arrangement and independent longitudinal play of the lever cause the rebounds thereof incident to sudden thrusts to be liable to break its pivotal fulcrum-pin, which objection and defect is overcome by my improvement.

I claim as my invention—

1. In a car-coupling, the combination of a sliding draw-bar, A, having a depressed surface, A', the pin-carrying coupling-lever B, having a corresponding top surface and an upwardly-inclined and elevated head, *b*, and a shaft, C, having a crank or cam, C', extending across the said sliding draw-bar and pin-carrying coupling-lever, substantially as shown and described, to operate in the manner set forth, for the purposes specified.

2. The draw-bar having the slot *s* extending vertically through the same and terminated with lateral offsets or shoulders *a a* in the mortise *s'*, and the lever B, carrying a coupling-pin at its front end, pivoted in slot *s*, and having the enlarged head *b* fitted into the mortise and against the shoulders *a* thereof, all constructed, arranged, and combined substantially as shown and described, to operate in the manner set forth, for the purposes specified.

WILLIAM H. ROUNDY.

Witnesses:
W. H. JONES,
D. W. CUNNINGHAM.